United States Patent [19]

Kulhanek

[11] 4,056,000
[45] Nov. 1, 1977

[54] ALTITUDE RELEASE MECHANISM

[75] Inventor: Frank C. Kulhanek, Hinsdale, Ill.

[73] Assignee: The United States of America as represented by the United States Energy Research and Development Administration, Washington, D.C.

[21] Appl. No.: 778,188

[22] Filed: Mar. 16, 1977

[51] Int. Cl.² ............................................. G01W 1/08
[52] U.S. Cl. ............................ 73/170 R; 116/DIG. 9
[58] Field of Search .............. 73/170 R; 116/DIG. 8, 116/DIG. 9; 46/86 R, 87, 88

[56] References Cited

U.S. PATENT DOCUMENTS

| 2,906,125 | 9/1959 | Jewett | 73/170 R |
|---|---|---|---|
| 3,800,590 | 4/1974 | Arken et al. | 73/170 R |

*Primary Examiner*—James J. Gill
*Assistant Examiner*—Anthony V. Ciarlante
*Attorney, Agent, or Firm*—Dean E. Carlson; Frank H. Jackson

[57] ABSTRACT

An altitude release mechanism for releasing a radiosonde or other measuring instrument from a balloon carrying it up into the atmosphere includes a bottle partially filled with water, a tube sealed into the bottle having one end submerged in the water in the bottle and the free end extending above the top of the bottle and a strip of water-disintegrable paper held within the free end of the tube linking the balloon to the remainder of the package. As the balloon ascends, the lowered atmospheric air pressure causes the air in the bottle to expand, forcing the water in the bottle up the tubing to wet and disintegrate the paper, releasing the package from the balloon.

2 Claims, 2 Drawing Figures

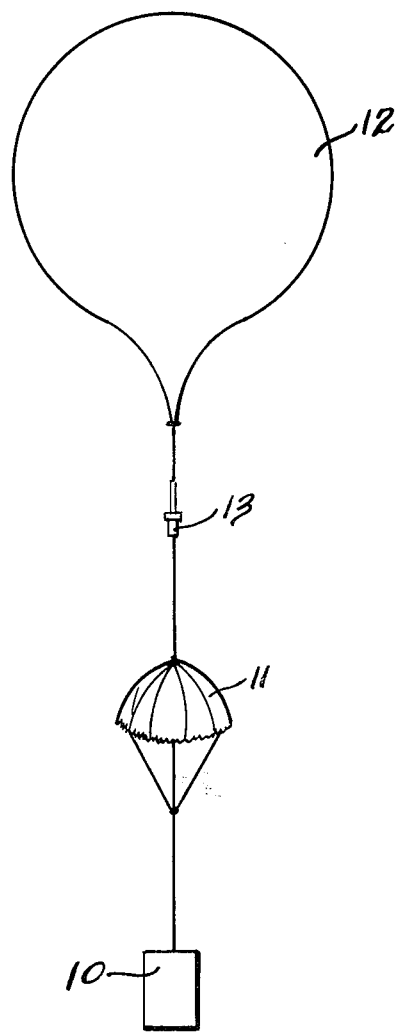
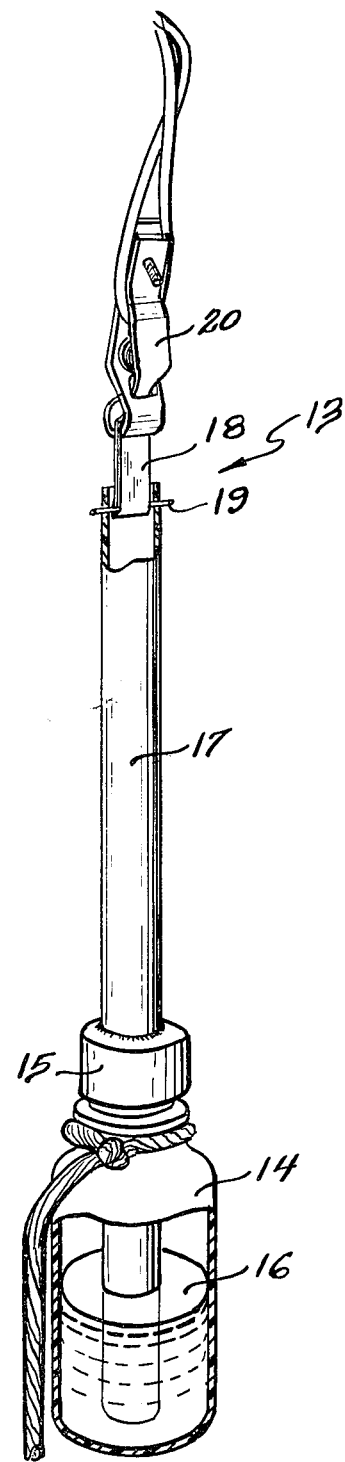

ALTITUDE RELEASE MECHANISM

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an altitude release mechanism. In more detail, the invention relates to a mechanism for releasing at a predetermined altitude a radiosonde or other instrument package from the balloon carrying it aloft.

A radiosonde is defined in Webster's Unabridged Dictionary as a miniature radio transmitter with instruments that is carried aloft (as by an unmanned balloon) for broadcasting by means of precise tone signals or other suitable method the humidity, temperature and pressure every few seconds. Usually data from as high an altitude as possible are required and the radiosonde is permitted to continue to ascend until the balloon bursts, at which time a parachute will return the radiosonde to the ground.

For investigations extending only to a limited height such as investigations of pollutants within the planetary boundary layer, release of the radiosonde from the balloon at a desired height makes it possible to obtain data on the descent as well as the ascent, provided the altitude of release is picked such that the radiosonde remains in radio range of the receiver on the descent.

Various release mechanisms have been used in the past. For example, two partially evacuated hemispheres which separate at an altitude where ambient pressure equals evacuated pressure have been used. See Angstein et al., Boundary-Layer Meteorology, Vol. 6, pages 129–150 (1974). Disadvantages of this procedure are that air leaking into the system causes premature separation and, alternatively, adhesion between the two hemispheres may cause separation to be delayed.

Another time-release mechanism utilizes an ice cube in which supporting cords are frozen; these separate on thawing. Obviously, this system will not function in freezing weather, is temperature-sensitive and, if the launch is delayed, the separation time will be shortened to include the delay.

SUMMARY OF THE INVENTION

According to the present invention, a pressure release mechanism for releasing a radiosonde or other measuring instrument from a balloon at a predetermined altitude incorporates a short length of water-disintegrable paper forming the link between a balloon and the parachute and radiosonde package. The water-disintegrable paper is held within the open top end of a plastic tube sealed into a bottle half filled with water. As the package rises, the decreasing air pressure causes the air in the bottle to expand, forcing the water up the tube to reach and dissolve or weaken the water-disintegrable paper so that the balloon and radiosonde package separate.

BRIEF DESCRIPTION OF THE DRAWINGS

FIG. 1 is a sketch of a radiosonde package incorporating the altitude release mechanism of the present invention and FIG. 2 is a sketch of the altitude release mechanism.

SPECIFIC EMBODIMENT OF THE INVENTION

The altitude release mechanism of the present invention serves as the connecting link between a radiosonde package incorporating the radiosonde 10 and a parachute 11 and a balloon 12. The altitude release mechanism 13 includes a polyethylene bottle 14 provided with a screw cap 15 and half filled with water 16. A polyethylene tube 17 is sealed in cap 15 and extends from a point near the bottom of bottle 14 where it will at all times be submerged in the water contained therein to a point above the top of the cap. A strip of water-disintegrable paper 18 is held within the open end of tube 17 by a pin 19. The paper strip 18 is attached to the balloon string with a small battery clip 20 to equalize the holding pressure across the strip of paper. As the balloon 12 ascends, the lowered atmospheric air pressure causes the air in the bottle 14 to expand, forcing the water in the bottle up the tube 17. When the package has ascended to the desired height, the water will reach the strip of paper and dissolve it or weaken it through absorption to the extent that it will no longer support the weight of the bottle and radiosonde whereupon the bottle and radiosonde will be returned to the ground by parachute 11.

The device can be calibrated in an evacuated chamber to release at any desired altitude, the altitude of release being determined by the length of tube 17. Precautions must be taken to ensure that enough water is available to reach the paper and that the end of the tube is submerged in water at all times. Also care must be taken that there are no air leaks in the bottle or cap. If necessary, a larger bottle can be used to ensure that enough water is available when a longer tube is used to reach a higher altitude. It is, of course, also necessary that the bottle contain enough air to provide the driving force for pushing the water up the tube. Accordingly, the bottle, regardless of size, should be filled about half full of water. This provides sufficient water to fill a reasonable length tube and enough air to serve as the driving force. The width of the tube 17 is not critical. It must be wide enough to accept the strip of paper 16 and as narrow as possible to minimize the amount of water required to reach the strip of paper and therefore the size of the bottle.

Any type of paper that loses strength when it gets wet can be used. Commercially available water-soluble paper can, for example, be used, as can any paper which disintegrates on wetting such as blotting paper.

Under low-temperature conditions, alcohol should be added to the water to prevent freezing. Also, during ascent, the lowering of temperature slows expansion of air in the bottle and must be compensated for by shortening the length of tubing slightly. In wet weather a shield over the water-disintegrable paper should be used to prevent premature separation. Also, upon separation, the device may fall on the parachute, causing it to be deformed and descend at a fast rate.

A device which will now be described in more detail has been used successfully in field experiments. A one-fluid-ounce "Tygon" bottle, half filled with water, and one-quarter-inch (ID) "Tygon" tubing which extends to a point 15 cm above the top of the cap were employed. The paper was a special water-soluble paper sold commercially as such. As described, the device is set to release at about 1800 meters. The device can be set to release at any desired altitude by adjusting the length of the tubing and changing the width of the tubing and the size of the bottle as may be necessary so that the bottle contains sufficient water to reach the paper and sufficient air to drive the water up to the paper. For the bottle and tube described, a rough estimate of the height of release can be obtained by assuming about 1 cm per hundred meters. As described above, more accurate calibration is attained in an evacuated chamber.

The embodiments of the invention in which an exclusive property or privilege is claimed are defined as follows:

1. An altitude release mechanism for releasing an instrument from a balloon at a predetermined altitude whereupon the instrument is lowered to the ground by parachute comprising a plastic bottle provided with a cap, said bottle being partially filled with water, a plastic tube sealed in the cap with one end submerged in the water and the other end extending above the top of the cap, said instrument and parachute being connected to the bottle and means for connecting the balloon to the bottle including a strip of water-disintegrable paper held within the open free end of the plastic tube whereby expanding air in the bottle due to decreased atmospheric air pressure as the balloon rises forces the water up the tube to reach and dissolve the water-disintegrable paper, thereby severing the link between the plastic bottle and balloon, permitting the instrument to fall to earth, 2. Mechanism according to claim 1 wherein the bottle is one fluid ounce in volume, is half full of water, the tube is ¼ inch I.D. and 15 cm long and the paper is a water-disintegrable paper.

* * * * *